US012110476B1

(12) United States Patent
Roozrokh et al.

(10) Patent No.: US 12,110,476 B1
(45) Date of Patent: Oct. 8, 2024

(54) LAUNDRY DETERGENT COMPOSITION

(71) Applicant: Tufco, L.P., Los Angeles, CA (US)

(72) Inventors: Shahram Roozrokh, Hauppauge, NY (US); Egal Gabbay, Los Angeles, CA (US)

(73) Assignee: Tufco, L.P., Los Angeles, CA (US)

( * ) Notice: Subject to any disclaimer, the term of this patent is extended or adjusted under 35 U.S.C. 154(b) by 0 days.

(21) Appl. No.: 18/433,255

(22) Filed: Feb. 5, 2024

(51) Int. Cl.

| | |
|---|---|
| ***C11D 17/00*** | (2006.01) |
| ***C11D 1/12*** | (2006.01) |
| ***C11D 1/72*** | (2006.01) |
| ***C11D 1/83*** | (2006.01) |
| ***C11D 3/00*** | (2006.01) |
| ***C11D 3/10*** | (2006.01) |
| ***C11D 3/20*** | (2006.01) |
| ***C11D 3/30*** | (2006.01) |
| ***C11D 3/34*** | (2006.01) |
| ***C11D 3/386*** | (2006.01) |
| ***C11D 3/42*** | (2006.01) |
| ***C11D 3/43*** | (2006.01) |
| ***C11D 17/04*** | (2006.01) |

(52) U.S. Cl.
CPC .............. *C11D 17/043* (2013.01); *C11D 1/12* (2013.01); *C11D 1/72* (2013.01); *C11D 1/83* (2013.01); *C11D 3/0005* (2013.01); *C11D 3/0047* (2013.01); *C11D 3/10* (2013.01); *C11D 3/2065* (2013.01); *C11D 3/2082* (2013.01); *C11D 3/30* (2013.01); *C11D 3/3454* (2013.01); *C11D 3/386* (2013.01); *C11D 3/38636* (2013.01); *C11D 3/42* (2013.01); *C11D 3/43* (2013.01); *C11D 2111/12* (2024.01)

(58) Field of Classification Search
CPC ........... C11D 17/043; C11D 1/12; C11D 1/72; C11D 1/83
See application file for complete search history.

(56) References Cited

U.S. PATENT DOCUMENTS

| | | | | |
|---|---|---|---|---|
| 2002/0151446 | A1* | 10/2002 | Piterski | C11D 1/94 510/156 |
| 2002/0177535 | A1* | 11/2002 | Piterski | A61K 8/64 510/156 |
| 2014/0335032 | A1* | 11/2014 | Panandiker | A61Q 3/02 510/276 |
| 2014/0335034 | A1* | 11/2014 | Panandiker | A61K 8/922 510/276 |
| 2014/0335167 | A1* | 11/2014 | Panandiker | A61Q 5/02 510/159 |
| 2015/0030643 | A1* | 1/2015 | Gartstein | C11D 3/3742 106/287.11 |
| 2015/0030644 | A1* | 1/2015 | Oh | C11D 1/62 424/70.122 |
| 2016/0213597 | A1* | 7/2016 | Oh | C11D 3/2075 |
| 2019/0093054 | A1* | 3/2019 | Patterson | C11D 3/38627 |
| 2019/0093055 | A1* | 3/2019 | Gori | C11D 1/831 |
| 2020/0078287 | A1* | 3/2020 | Fischer | A61K 47/32 |
| 2021/0155883 | A1* | 5/2021 | Piorkowski | C11D 3/0084 |

* cited by examiner

*Primary Examiner* — Nicole M. Buie-Hatcher
*Assistant Examiner* — M. Reza Asdjodi
(74) *Attorney, Agent, or Firm* — SoCal IP Law Group LLP; Steven C. Sereboff

(57) ABSTRACT

A composition for use in a laundry pouch comprises a first surfactant, an ethoxylated alcohol, a protease enzyme, an amylase enzyme, and a mannanase enzyme. The composition may be used in a pouch or added as a liquid detergent to a laundry wash. The laundry detergent composition may comprise a composition having at its essence a surfactant and an enzyme. The detergent composition may comprise more than one surfactant. Various enzymes may be used for stain removal or other reasons based on cleaning or treatment properties of such enzymes.

7 Claims, No Drawings

LAUNDRY DETERGENT COMPOSITION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to sealed, single-dose water soluble laundry detergent pouches and the laundry detergents contained therein.

Description of the Related Art

Laundry soaps and detergents are a necessity of modern life, and there is a wide array of such products available to meet different consumer preferences and needs. The soaps and detergents may be configured to work best in certain types of washing machines, for example, and may comprise ingredients and concentrations thereof which take into account such factors as level of soiling, wash temperature, and the like.

Laundry soaps may be available in the form of a liquid or powder detergent, or as pouches which contain, usually in concentrated amounts, the laundry detergent. The terms soap or detergent should be understood as comprising a liquid or a solid composition.

Liquid detergent may enter the washing machine tub or drum with the water, while pouches may be placed in the machine and dissolved by the water. Pouches have several benefits over liquid detergent, including the possible concentrated formula noted, which requires less space and quantity. Other advantages include the capability for precise doses of liquid detergent which can be premeasured and sealed in the pouch, as well as easier and less messy handling and transportation.

Laundry detergents in pouches may also offer the usual options of liquid detergent, including whether the detergents are scented or unscented. This is a personal consumer choice, some preferring a non-scented laundry wash while others may prefer the inclusion in the detergent of a scent or fragrance. Amongst the latter group, the choices are considerable, and many detergents will incorporate a scent which has a certain fragrance or smell. The pouches can be configured to contain the detergent so that a variety of fragrances may be available.

Temperatures in a washing machine may vary, and typically may be selected by the user. Typical washing machines either allow the user to select a specific temperature (often available in increments such as ten degrees) or have relative temperature options usually designated as hot, warm, cool and cold. These settings correspond to a temperature of water which is introduced into the washing machine's wash tub. Hot is generally 54 C to 60 C. Warm is generally between 32 C to 49 C. Cold is generally between 15 C to 30 C. The pouches are manufactured so that the pouch or outer container will dissolve in water within the wide range of temperatures normally used in a washing machine.

DETAILED DESCRIPTION

The laundry detergent compositions described herein may be added directly to a washing machine or may be contained in a pouch.

The pouch is water soluble, such that it will dissolve during operation of a washing machine, and may be a film made of polyvinyl alcohol (PVA) or a derivative of PVA. The film may be adapted to be soluble in cold water. The pouch may be biodegradable, and may include a variety of components. The pouch may comprise components which are inert in the washing machine, and may include active components. The pouch may include fragrance, such as free fragrance and/or encapsulated fragrance.

The term single-dose means sufficient laundry detergent composition contained in the pouch for one load of laundry. The dose may vary based upon the size of the load. The dose may correlate to a full load for a standard size washing machine, although the dose may be set for a partial load, such as one-half or three quarters, or for an extra large load.

The laundry detergent composition may comprise a composition having at its essence a surfactant and an enzyme. The detergent composition may comprise more than one surfactant. Various enzymes may be used for stain removal or other reasons based on cleaning or treatment properties of such enzymes. Enzymes may be selected from one or more of a protease, an amylase and a mannanase. In one formulation of the composition, all of these three enzymes, or a combination of two such enzymes, are a part of the composition.

The laundry detergent composition may also comprise a cationic polyethylene, which may operate as a fabric softener, a pH adjuster which may be in the form of citric acid but not limited thereto. Further, the laundry detergent composition may include a brightener for the laundry wash, as well as a base or soap, such as but not limited to monoethanolamine.

The laundry detergent composition may further comprise at least one solvent, a chelator which may facilitate the softening of the water, and an oxidant agent for fabric whitening purposes. The solvents may comprise, but are not limited to, propylene glycol and glycerin, individually or in combination.

Fragrance may be added to the laundry detergent composition, and may comprise many different compounds chosen for their suitability to provide the fragrance desired in a particular configuration of laundry detergent.

The laundry detergent composition may comprise a surfactant in the form of sodium laureth sulfate, an ethoxylated alcohol, and at least one enzyme. The sodium laureth sulfate may comprise 25% to 40% by weight of the composition, while the ethoxylated alcohol may comprise 17% to 30% by weight of the composition. In one form of the laundry detergent composition, there are three enzymes present therein, comprising protease, amylase and mannanase. Each of the enzymes may be present in the amount of 0.5% to 3% by weight of the composition.

The laundry detergent composition may comprise 25% to 40% sodium laureth sulfate (e.g., 29%, 30%, 31%, 32% or 33%), 17% to 30% fatty alcohol polyoxyethylene ether (e.g., 20%, 21%, 22% or 23%), 0.5% to 3% protease (e.g., 1.5%, 1.6%, 1.7%, 1.8% or 1.9%), 0.5% to 3% amylase, and 0.5% to 3% mannanase (e.g., 0.5%, 1.0%, 1.5%, 2.0%, 2.5% or 3.0%).

The laundry detergent composition may comprise a further surfactant, which may consist of ethoxylated tridecyl alcohol. The ethoxylated tridecyl alcohol may be present in an amount of 5% to 20% by weight, such as 6%, 10%, 13% or 18%.

Further, the laundry detergent composition may comprise a cationic polyethylene, which may be ethoxylated polyethyleneimine and may be present in an amount of 2% to 10% by weight, such as 3%, 4.5%, 5%, 5.5% or 6%.

The laundry detergent composition may include a pH adjustment component, such as in the form citric acid, although other pH adjusters may be used. The citric acid, when used, may be present in an amount of 0.5% to 3.5% by weight, such as 0.9%, 1.0%, 1.1% or 1.2%.

The laundry detergent composition may include a brightener, and the brightener may comprise disodium distyrylbiphenyl sulfonate. The disodium distyrylbiphenyl sulfonate may be present in the laundry detergent composition in the amount of 0.5% to 3% by weight, such as 0.5%, 0.7%, 0.9%, 1.2%, 1.4% or 1.6%.

The laundry detergent composition may further comprise at least one solvent, which may be in the form of propylene glycol, and this solvent may be present in the amount of 3% to 12% by weight, such as 4%, 7.5%, 9.5% or 11%. In addition, the laundry detergent composition may include a chelator, or chelating agent, which may be in the form of tetrasodium iminodisuccinate, which is present in an amount of 3% to 12% by weight, such as 5.0%, 6.0%, 7.0%, 8.0% or 9.0%.

An additional ingredient of the laundry detergent composition is a further solvent, which may be in the form of glycerin, present in the amount of 1.5% to 5% by weight, such as 2.0%, 2.5%, 3.0%, 3.5% or 4.0%).

Yet a further component in the laundry detergent composition may be an oxidant-whitening agent, which may be in the form of percarbonate sodium, and which is present in the amount 2% to 8% by weight, such as 2.0%, 2.5%, 3.0%, 4.0% 7.5% or 7.9%. The percarbonate sodium may be sodium carbonate peroxide solution 20%.

The laundry detergent composition may include a fragrance, which may have one or more of several scents, and such fragrance may be present in an amount sufficient to impart to the laundry detergent composition and the laundry wash the desired scent or scents. The fragrance may be present as a liquid in the amount of 0.50% by weight. The fragrance may take the form of beads, such as those described in U.S. application Ser. No. 18/521,377 which is incorporated herein by reference.

The laundry detergent composition may comprise sodium laureth sulfate, a fatty alcohol polyoxyethylene ether, a protease enzyme, an amylase enzyme and a mannanase enzyme, the foregoing components being combined with one or more of the following:

a. ethoxylated tridecyl alcohol;
b. ethoxylated polyethyleneimine;
c. citric acid;
d. disodium distyrylbiphenyl disulfonate;
e. propylene glycol;
f. tetrasodium iminodisuccinate;
g. glycerin; and
h. percarbonate sodium.

The components above may have the following proportions and ranges withing the composition:

a. sodium laureth sulfate: 25% to 40%, such as 30%, 31%, 32%, 33% or 34%;
b. a fatty alcohol polyoxyethylene ether: 17% to 30%, such as 20%, 21%, 22%, 23%, 24% or 25%;
c. protease enzyme, amylase enzyme and mannanase enzyme: 0.5% to 3%, such as 1%, 1.5%, 1.65%, 1.8% or 2.3%;
d. ethoxylated tridecyl alcohol: 5% to 20%, such as 7%, 13%, 15% or 17.4%;
e. ethoxylated polyethyleneimine: 2% to 10%, such as 3.2%, 4.5%, 4.8%, 6.5% or 8%;
f. citric acid: 0.5% to 3.5%, such as 1%, 1.5%, 1.7%, 2.4% or 2.8%;
g. disodium distyrylbiphenyl disulfonate: 0.5% to 3%, such as 0.7%, 1.2%, 1.5%, 1.8% or 2.3%;
h. propylene glycol: 3% to 12%, such as 3%, 4.5%, 7.5%, 8.4% or 9%;
i. tetrasodium iminodisuccinate: 3% to 12%, such as 3%, 4.5%, 7%, 7.5% or 9%;
j. glycerin: 1.5% to 5%, such as 1.8%, 1.9%, 2.0%, 2.5% or 2.6%; and
k. percarbonate sodium: 2% to 8%, such as 3.5%, 4%, 4.5% or 7%.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A product comprising a laundry detergent composition which consists essentially of: a combination of surfactants consisting of 25% to 40% sodium laureth sulfate, 2% to 10% ethoxylated tridecyl alcohol, and 17% to 30% fatty alcohol polyoxy-ethylene ether, 0.5% to 3% a protease enzyme,
0.5% to 3% an amylase enzyme and
0.5% to 3% a mannanase enzyme,
the foregoing components are combined with at least one of the following:
(a) ethoxylated polyethyleneimine;
(b) citric acid;
(c) disodium distyrylbiphenyl disulfonate;
(d) 3% to 12% propylene glycol;
(e) tetrasodium iminodisuccinate;

(f) 1.5% to 5% glycerin; and (g) percarbonate sodium.

2. The product of claim 1 wherein the disodium distyrylbiphenyl disulfonate is present in the composition in an amount of 0.5% to 3% by weight.

3. The product of claim 1 further comprising a base or soap which comprises monoethanolamine present in the composition in an amount of 0.1% to 2% by weight.

4. The product of claim 1 wherein the tetrasodium iminodisuccinate is present in the composition in the amount of 3% to 12% by weight.

5. The product of claim 1 wherein the percarbonate sodium is present in the composition in an amount of 2% to 8% by weight.

6. The product of claim 1 wherein the citric acid is present in the composition in the amount of 0.5% to 3.5% by weight.

7. The product of claim 1 comprising a sealed, single-dose water soluble pouch containing the laundry composition.

* * * * *